June 5, 1945.  W. S. BOWEN  2,377,478
APPARATUS FOR PRODUCING METALLIC MAGNESIUM
Filed March 18, 1942  2 Sheets-Sheet 2
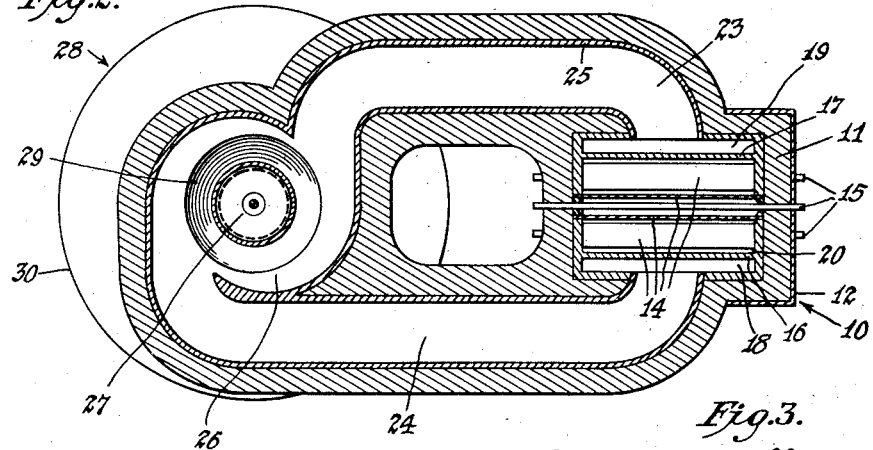
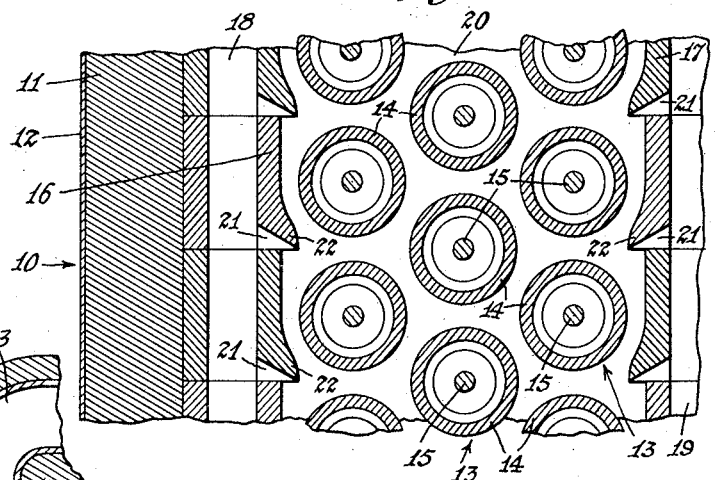
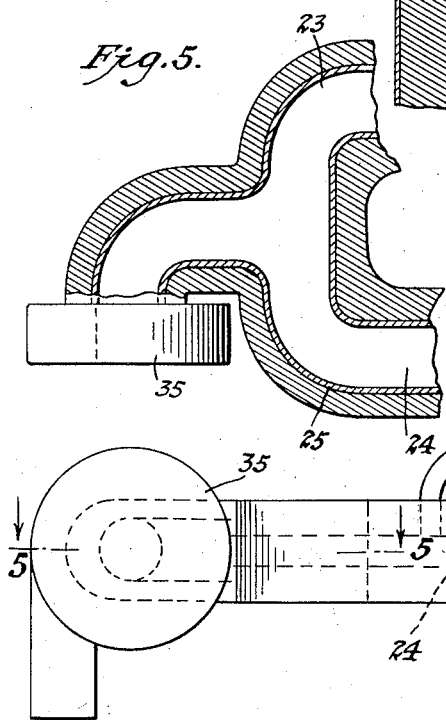
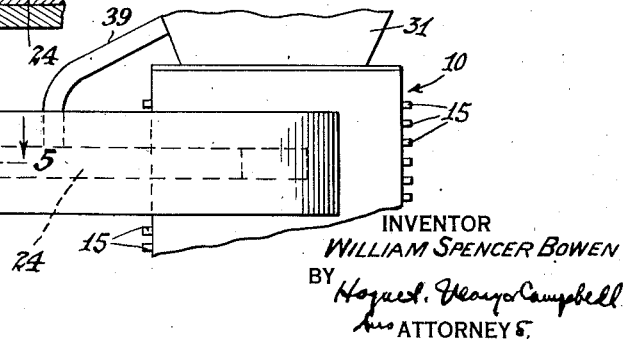
INVENTOR
WILLIAM SPENCER BOWEN
BY
ATTORNEYS Patented June 5, 1945

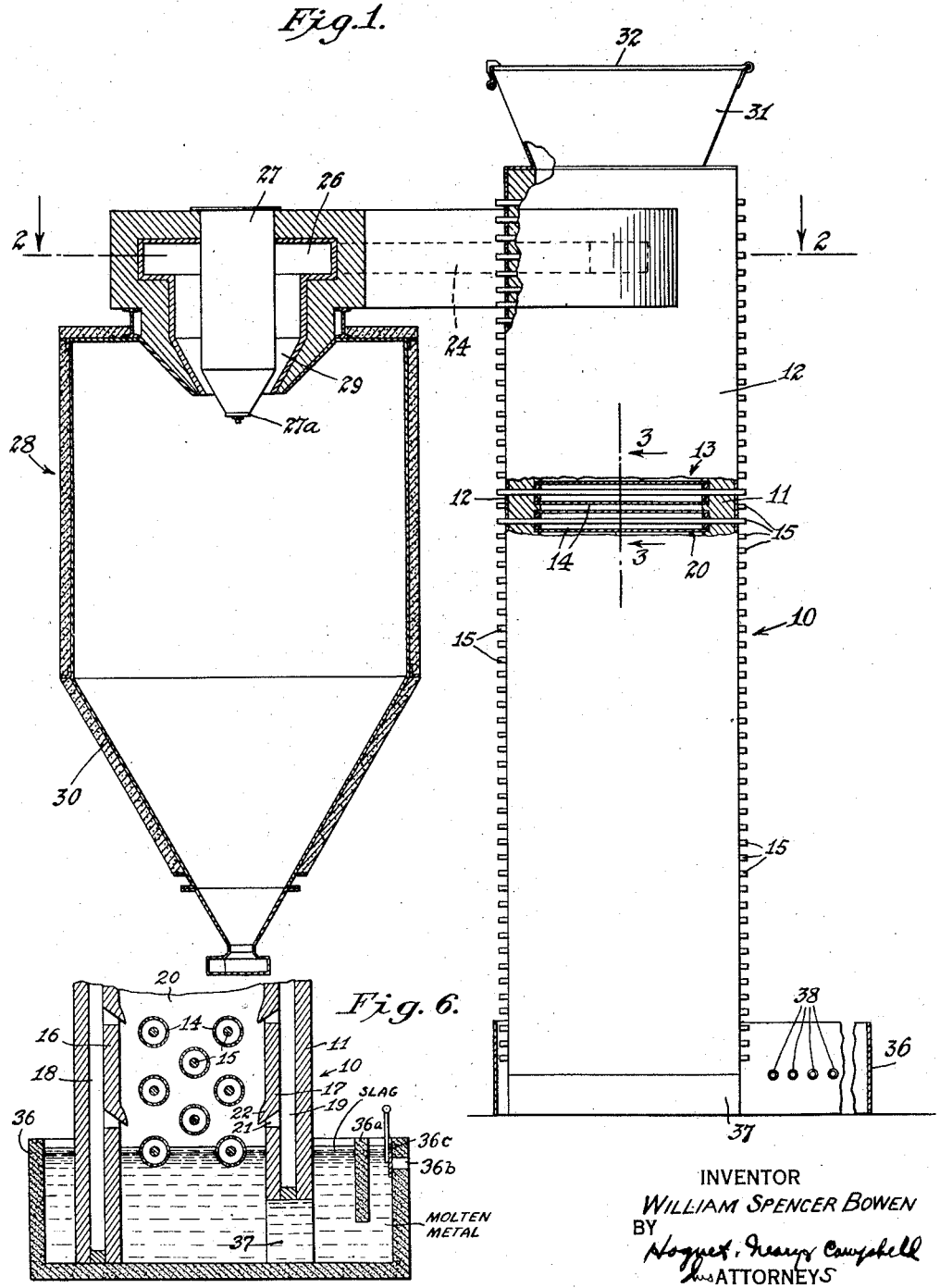

2,377,478

UNITED STATES PATENT OFFICE 2,377,478

APPARATUS FOR PRODUCING METALLIC MAGNESIUM

William Spencer Bowen, Westfield, N. J.

Application March 18, 1942, Serial No. 435,174

8 Claims. (Cl. 13—20)

This invention relates to apparatuses for recovering magnesium from magnesium-containing compounds and relates particularly to improvements in reducing furnaces for reducing magnesium compounds to metallic magnesium.

An object of the invention is to provide a reducing furnace by means of which magnesium compounds can be reduced to metallic magnesium.

Other objects of the invention will become apparent from the following description of typical forms of method and apparatus embodying the present invention.

In accordance with the present invention, I have provided a reducing furnace which is capable of operation under closely controlled temperature conditions and which may be sealed from the surrounding atmosphere to permit close control of the reducing operation taking place therein.

More particularly, I have provided an electrically heated reducing furnace including a plurality of electric heating elements so arranged in a furnace shaft that the material undergoing reduction therein must pass in intimate contact with the heating elements and travel through tortuous passageways so that uniform heating of the material is obtained. Moreover, when treating ores, for example, magnesium ores, which are difficult to reduce and in which the reduced metal is readily reoxidized, furnaces of the type embodying the present invention may be provided with sealing means in opposite ends of the shaft which prevent the entry of air thereinto and thus prevent reoxidation of the reduced metal. In addition, the sealing means may be so arranged that the furnace can be operated under reduced pressures and the oxidizing gases produced by the reducing operation can be withdrawn in order to maintain a favorable reducing balance between the gases and the reduced metal.

Furnaces of the type embodying the invention may be used in known processes of producing magnesium metal in which the reduced metal is vaporized and then chilled suddenly to freeze it into a powdered form. However, the furnace has the particular advantage of permitting close and accurate control of the temperature conditions prevailing within the furnace.

For a better understanding of the present invention, reference may be had to the accompanying drawings, in which:

Figure 1 is a view in side elevation of a typical form of reducing furnace embodying the present invention, partly broken away to disclose details of its construction;

Figure 2 is a view in section taken on line 2—2 of Figure 1;

Figure 3 is a view in cross-section taken on line 3—3 of Figure 1, disclosing details of the heating elements;

Figure 4 is a view in side elevation of a portion of a modified form of device embodying the invention;

Figure 5 is a view in section taken on line 5—5 of Figure 4; and

Figure 6 is a view in section showing details of the metal-receiving tank at the bottom of the furnace.

As illustrated in Figure 1, a typical form of reducing furnace illustrative of apparatus embodying the present invention may consist of a furnace shaft 10 of generally square or rectangular cross-section having a lining 11 of refractory material therein, enclosed in a casing 12 of iron or steel to strengthen, rigidify and seal the furnace shaft against leakage of air into said furnace shaft.

As shown in Figure 3, the shaft 10 contains a plurality of heating elements 13 in staggered relationship which may consist of tubular members 14 formed of a refractory material such as, for example, "Carbofrax" (silicon carbide) tile, which are suitably sealed at their ends to the refractory lining 11 of the furnace shaft and contain electric resistance heating elements 15 commonly known as "Glo-bars" formed of silicon carbide which are heated to a high temperature by passing electric current therethrough. The ends of the heating rods or bars 15 extend through the refractory lining 11 of the furnace shaft to the exterior thereof and may be connected to opposite poles of a suitable source of electric current. While electric heating units are preferred because of the accurate temperature control obtainable therewith, the tubes 14 may be heated by gas or liquid fuel burners within the tubes 14.

On opposite sides of the heating elements 13 are spaced apart walls 16 and 17 which are formed of refractory material dividing the shaft 10 into the gas escape ducts 18 and 19 extending along the sides of the furnace shaft and the reduction chamber 20. The walls 16 are provided with a plurality of gas escape ports 21 communicating with the interior of the furnace shaft to allow gases to escape or be withdrawn from within the chamber 20 of the furnace shaft.

The gas escape ports 21 are shielded from the material moving down through the furnace shaft by means of lips 22 projecting inwardly from the inner surface of the walls 16 and 17 so that the material undergoing reduction or the reduced metal will not be drawn out of the ducts 21.

As shown in Figure 2, the gases escape upwardly through the ducts 18 and 19 and through the flues 23 and 24 connected thereto. The flues are provided with a refractory lining 25 in view of the high temperature of the gases.

While the furnace is used for vaporizing the reduced magnesium in accordance with the process disclosed in my copending application Serial No. 425,239, filed December 31, 1941, the flues 23 and 24 may lead tangentially into an annular chamber 26 encircling the spray unit 27 of a spray drying apparatus 28.

The spray unit 27 may be of any desired type including, for example, a rotary type spray head 27a for delivering a finely divided shower of water to chill the vaporized metal and reduce it to powdered metal. The vapors from the furnace are discharged through a tapering chamber 29 around the spray unit 27 into a collecting hopper 30 where the vapors and gases are chilled suddenly by the shower of water discharged by the spray head 27a. The gases and solidified material may be drawn off at the bottom of the hopper 30, and delivered to a collector or separator of any desired type (not shown).

The material to be reduced is fed into the inner chamber 20 by means of a hopper 31 mounted on the upper end of the furnace shaft 10 and communicating with its interior. The form of hopper illustrated is provided with a door or hatch 32 at its upper end for substantially sealing the hopper against entry of air.

As shown in Figure 4 of the drawings, the reduction furnace may be modified to render it suitable for reduction of magnesium compounds to metallic magnesium without vaporization of the metallic magnesium. In this form of device, the flues 23 and 24 are connected directly to the intake side of a suction fan 35 so that the gases formed during reducing reaction can be withdrawn from the furnace.

Each of the above-described forms of reducing furnaces is provided with a slag-receiving tank or sump 36 which communicates with the reducing chamber 20 through an opening 37 at the bottom of the chamber. The opening 37 is sufficiently narrow to be disposed beneath the surfaces of and sealed by the slag and/or other molten material in the sump 36. Heating elements 38 are mounted in the tank to prevent the slag and/or other molten material from freezing. The heating elements 38 may be the same as the heating elements 13.

In the reduction of magnesium ores or compounds such as, for example, magnesium carbonate or magnesium oxide to metal in accordance with my improved method, a finely divided mixture of magnesium oxide derived from any suitable source, such as magnesite, dolomite or sea water, and a carbonaceous reducing agent such as, for example, coke or carbon is fed into the hopper 31 and thence into the reducing chamber 20, where its temperature is raised by the heating elements 13 to between the melting and vaporization temperatures of metallic magnesium, i. e., between about 651° C. and 1102° C. Preferably, the temperature in the furnace shaft is maintained at about 1090° C. so that the magnesium which is freed by reaction of the magnesium compound with the carbon will be in a molten state and will trickle down over the heating elements toward the lower end of the furnace shaft. The carbon monoxide which is formed by the reducing operation is withdrawn through the ducts 21, 18, 19, 23 and 24 by means of the suction fan 35 so as to prevent substantial recombination of the carbon monoxide with the metallic magnesium and to withdraw any air which may have been drawn into the furnace shaft with the charge.

The molten magnesium flows downwardly through the reducing chamber 20 into the receiving tank 36 at the bottom thereof together with any molten slag or other material and accumulates in the tank 36 beneath the layer of slag which floats on the surface of the magnesium. The floating slag acts to prevent contact between the air and the molten magnesium.

The molten metal may be withdrawn from the tank 36 in any desired or obvious manner. For example, as shown in Figure 6, the tank 36 may be provided with a downwardly extending partition 36a terminating short of the bottom of the tank, and an outlet 36b in the end of the tank 36 beneath the surface of the molten metal. A gate valve 36c normally closes the outlet 36b, but may be raised to permit the molten metal to be withdrawn from the tank 36 from beneath the slag.

As shown in Figure 4, entry of air through the hopper 31 may be avoided by connecting the upper portion of the hopper 31 to the suction fan 35 by means of a conduit 39 so that air therein will be withdrawn directly from the hopper 31 rather than drawn through the charge into the reducing chamber 20.

As indicated above, sea water may be used as a source of magnesium oxide for use in my above described process. The method of recovering magnesium oxide from sea water is as follows:

Calcium carbonate is calcined to drive off carbon dioxide and the calcium oxide in the form of lime water is mixed with sea water to convert the magnesium compounds therein to magnesium hydroxide. The precipitated magnesium hydroxide sludge is evaporated in a spray dryer which utilizes the heated carbon dioxide from the calcining operation as a drying medium. The dried residue of the spray drying operation is calcined to drive off carbon dioxide and leave a residue containing magnesium oxide. The heated carbon dioxide may be used in the spray drying operation referred to above, while the magnesium oxide-containing residue may be treated as described in this application to convert the magnesium oxide into metallic magnesium.

The above-described method of producing metallic magnesium from magnesium-containing compounds is advantageous in that it does not require vaporization of the reduced magnesium and quick chilling under non-oxidizing conditions that have been found necessary in some prior types of operations.

The furnace construction disclosed herein is advantageous in that it permits close control of the reducing temperatures and thus assures proper melting of the magnesium without vaporization of the same and without reoxidation of the magnesium to magnesium oxide. Moreover, the arrangement of the heating elements is such that the "Glo-bars" are protected from attack by the gases or the molten or heated material, but at the same time efficiently transmit their heat to the material being reduced.

It will be understood that the apparatus disclosed herein is not limited to the treatment of magnesium ores, but may be used for the reduction or heating of many different types of materials. Moreover, the process disclosed herein may be practiced with other types of reducing furnaces which have similar characteristics and, therefore, the process should not be regarded as limited to the use of the specific form of apparatus disclosed herein. Therefore, the specific embodiments of the apparatus and method disclosed herein should be considered as illustrative only and not as limiting the scope of the following claims.

I claim:

1. An apparatus for reducing ores to metal comprising a vertical furnace shaft, a plurality of heating elements, tubular shields for said heating elements extending across said shaft to form passages between said shields, means for withdrawing gases from within said furnace shaft, and a tank at the bottom of said shaft for receiving molten material to seal the bottom of said shaft.

2. An ore reducing furnace comprising a vertical furnace shaft, a plurality of heating elements, tubular shields for said heating elements extending transversely of said shaft to form passages therebetween, means for withdrawing gases from said shaft at a plurality of zones spaced vertically along said shaft, and a tank at the lower end of said shaft for receiving molten material for sealing the lower end of said shaft.

3. An ore reducing furnace comprising a vertical furnace shaft having a plurality of gas escape vents in the walls thereof, a plurality of refractory tubular members extending transversely of said shaft to form passages therebetween, heating means in said tubular members, means for sealing said shaft, and means for withdrawing gases from said furnace shaft to create a reduced pressure in said shaft.

4. A reducing furnace comprising a furnace shaft, means for introducing material to be reduced into the top of said shaft, a plurality of refractory tubes extending across said shaft in staggered relationship, electric heating elements in said tubes, means for sealing the top of said shaft, a tank at the bottom of said shaft for receiving molten material to seal the bottom of said shaft, and means for withdrawing gases from within said shaft.

5. An ore reducing furnace comprising a vertical furnace shaft, a plurality of heating elements extending transversely of said shaft in staggered relationship to form tortuous passages therebetween, means forming ducts on opposite sides of said furnace shaft, means forming a plurality of ports connecting said ducts with the interior of said furnace shaft at a plurality of vertically spaced zones, and means directly above said ports projecting into said shaft for shielding said ports.

6. An ore reducing furnace comprising a vertical furnace shaft, a plurality of heating elements, tubular shields for said heating elements extending transversely of said shaft in staggered relationship to form tortuous passages therebetween, means forming ducts on opposite sides of said furnace shaft which communicate with a condensing chamber, means forming a plurality of ports connecting said ducts with the interior of said furnace shaft at a plurality of vertically spaced zones, means directly above said ports projecting into said shaft for shielding said ports, and a spray cooling mechanism in said chamber for producing a shower of liquid to cool gases issuing from said ducts.

7. An ore reducing furnace comprising a vertical furnace shaft, a plurality of heating elements, tubular shields for said heating elements extending transversely of said shaft in staggered relationship to form tortuous passages therebetween, means forming ducts on opposite sides of said furnace shaft, means forming a plurality of ports connecting said ducts with the interior of said furnace shaft at a plurality of vertically spaced zones, means directly above said ports projecting into said shaft for shielding said ports, and means communicating with said ducts for withdrawing gases from said furnace shaft.

8. An ore reducing furnace comprising a vertical furnace shaft, a plurality of tubular members formed of refractory material extending transversely of said furnace shaft in staggered relation to form tortuous passageways therebetween, electric heating elements in said tubular members, means for sealing said furnace shaft against substantial entry of air, and means for exhausting gases from the said furnace shaft.

WILLIAM SPENCER BOWEN.